US012669624B2

(12) United States Patent
Dolinsky

(10) Patent No.: US 12,669,624 B2
(45) Date of Patent: Jun. 30, 2026

(54) SYSTEMS AND METHODS FOR TIME OF FLIGHT POSITRON EMISSION TOMOGRAPHY

(71) Applicant: GE Precision Healthcare LLC, Wauwatosa, WI (US)

(72) Inventor: Sergei Dolinsky, Clifton Park, NY (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 321 days.

(21) Appl. No.: 18/335,909

(22) Filed: Jun. 15, 2023

(65) Prior Publication Data

US 2024/0418879 A1 Dec. 19, 2024

(51) Int. Cl.
*G01T 1/29* (2006.01)
*G01T 1/20* (2006.01)
*G01T 1/22* (2006.01)
*G01T 1/24* (2006.01)

(52) U.S. Cl.
CPC ........ *G01T 1/2985* (2013.01); *G01T 1/20183* (2020.05); *G01T 1/20184* (2020.05); *G01T 1/20185* (2020.05); *G01T 1/22* (2013.01); *G01T 1/248* (2013.01)

(58) Field of Classification Search
None
See application file for complete search history.

(56) References Cited

U.S. PATENT DOCUMENTS

| | | | | |
|---|---|---|---|---|
| 10,310,098 | B1 * | 6/2019 | Qiang | G01T 1/1648 |
| 2005/0104002 | A1 * | 5/2005 | Shah | C30B 11/00 |
| | | | | 250/363.03 |
| 2014/0224963 | A1 * | 8/2014 | Guo | G01T 1/2985 |
| | | | | 250/208.1 |
| 2021/0093261 | A1 | 4/2021 | Kim | |
| 2021/0236073 | A1 * | 8/2021 | Kawata | A61B 6/5282 |
| 2022/0120923 | A1 * | 4/2022 | Goldan | G01T 1/1644 |

OTHER PUBLICATIONS

EP application 24178407.3 filed May 28, 2024—Search report issued Oct. 16, 2024; 13 pages.
Fitzpatrick Tim Maximilian: "A compton camera prototype with [gamma] -PET imaging capability: from component evaluations to online tests", Feb. 22, 2022 (Feb. 22, 2022), pp. 1-266, XP093095119, Retrieved from the Internet: URL: https://edoc.ub.uni-muenchen. de/29791/ 1/Fitzpatrick_Tim_Maximilian.pdf [retrieved on Oct. 25, 2023].

(Continued)

*Primary Examiner* — Edwin C Gunberg
(74) *Attorney, Agent, or Firm* — McCoy Russell LLP

(57) ABSTRACT

Systems and methods for a time of flight (TOF) positron emission tomography (PET) system is herein provided. In one example, an imaging system comprises one or more detector blocks, each detector block including an array of silicon photomultiplier (SiPM) devices coupled to an array of scintillation crystals with a one-to-one coupling arrangement, wherein each SiPM device of the array of SiPM devices transmits signals to independent front-end readout circuits of one or more analog application-specific integrated circuits (ASICs). The front-end readout circuits are configured to detect individual scintillating photons and suppress SiPM dark counts.

17 Claims, 10 Drawing Sheets

(56)  References Cited

OTHER PUBLICATIONS

Park Haewook et al: "Silicon photomultiplier signal readout and multiplexing techniques for positron emission tomography: a review", Biomedical Engineering Letters, the Korean Society of Medical and Biological Engineering, Korea, vol. 12, No. 3, Jul. 16, 2022 (Jul. 16, 2022), pp. 263-283, XP037909804, ISSN: 2093-9868, DOI: 10.1007/S13534-022-00234-Y [retrieved on Jul. 16, 2022].

Zhao Zhixiang et al: "An Advanced 100-Channel Readout System for Nuclear Imaging", IEEE Transactions On Instrumentation and Measurement, IEEE, USA, vol. 68, No. 9, Sep. 1, 2019 (Sep. 1, 2019), pp. 3200-3210, XP011739240, ISSN: 0018-9456, DOI: 10.1109/11M.2018.2877952 [retrieved on Aug. 8, 2019].

* cited by examiner

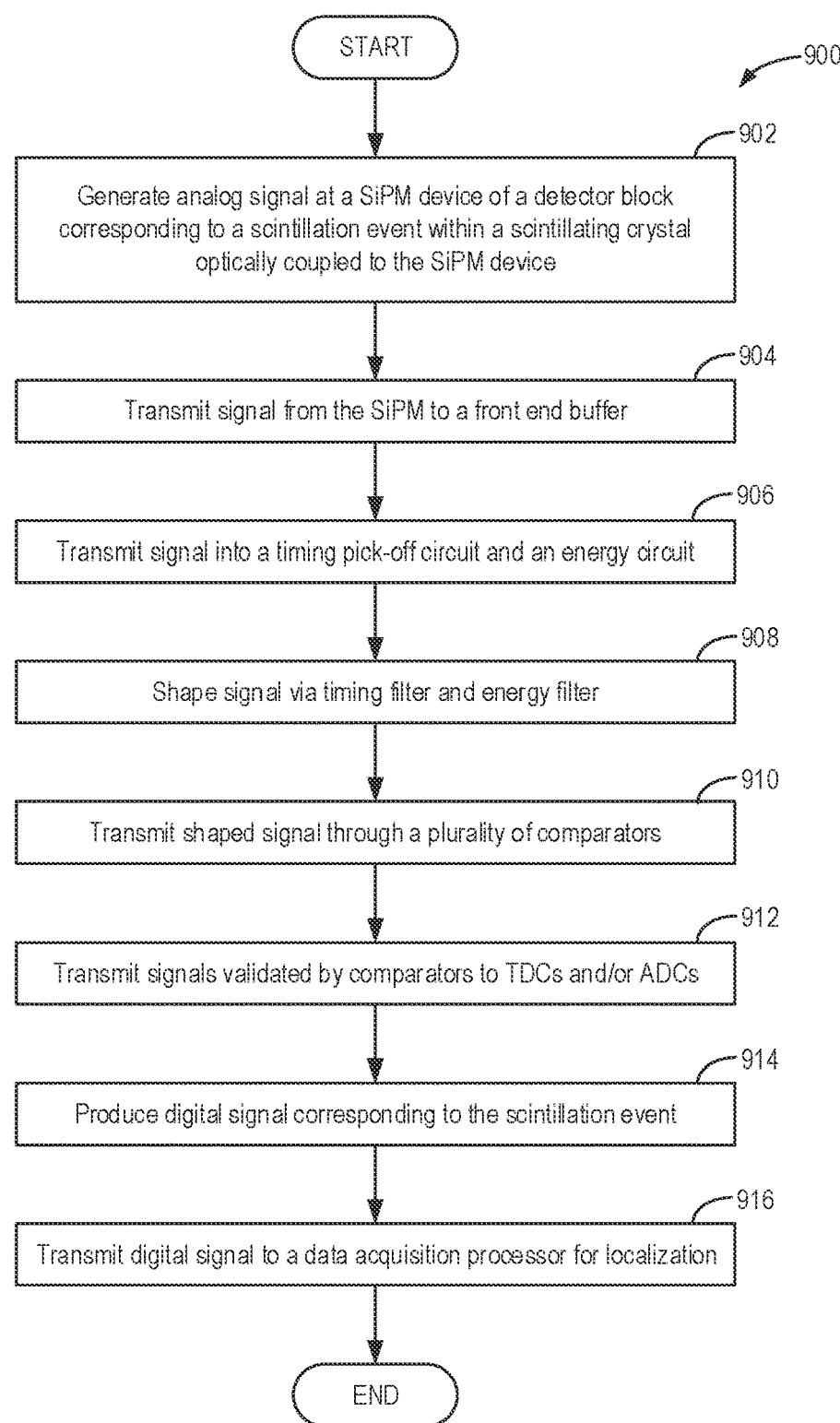

START

900

902
Generate analog signal at a SiPM device of a detector block corresponding to a scintillation event within a scintillating crystal optically coupled to the SiPM device 904
Transmit signal from the SiPM to a front end buffer 906
Transmit signal into a timing pick-off circuit and an energy circuit 908
Shape signal via timing filter and energy filter 910
Transmit shaped signal through a plurality of comparators 912
Transmit signals validated by comparators to TDCs and/or ADCs 914
Produce digital signal corresponding to the scintillation event 916
Transmit digital signal to a data acquisition processor for localization

END

FIG. 9

SYSTEMS AND METHODS FOR TIME OF FLIGHT POSITRON EMISSION TOMOGRAPHY

FIELD

Embodiments of the subject matter disclosed herein relate to positron emission tomography (PET) systems, and more particularly to time-of-flight PET block detectors.

BACKGROUND

A positron emission tomography (PET) scanner generates images that represent the distribution of positron-emitting nuclides within the body of a patient. When a positron interacts with an electron by annihilation, the entire mass of a positron-electron pair is converted into two photons (also referred to as events). The photons are emitted in opposite directions along a line of response (LOR). The annihilation photons are detected by detectors that are placed on both sides of the LOR, in a configuration such as a detector ring. In a time of flight (TOF) PET, in addition to measurement of the interaction location in detectors, an actual time difference between the detection of photons is measured with high precision to more accurately identify the location of the annihilation event along the LOR. The detectors convert the incident photons into useful electrical signals that can be used for image formation. Modern PET systems include scintillators and photodetectors such as silicon photomultiplier (SiPM) devices.

BRIEF DESCRIPTION

In one example, an imaging system is provided herein, the imaging system comprising a detector block, the detector block including an array of silicon photomultiplier (SiPM) devices coupled to an array of scintillation crystals with a one-to-one coupling arrangement, wherein each scintillating crystal is coupled to an individual SiPM device of the array of SiPM devices. The signals from SiPM devices are transmitted to independent front-end readout circuits of one or more analog application-specific integrated circuits (ASICs).

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 9 is a flowchart illustrating a method of operation of the readout circuit of FIG. 8, according to an embodiment of the present invention.

DETAILED DESCRIPTION

Figure 3:
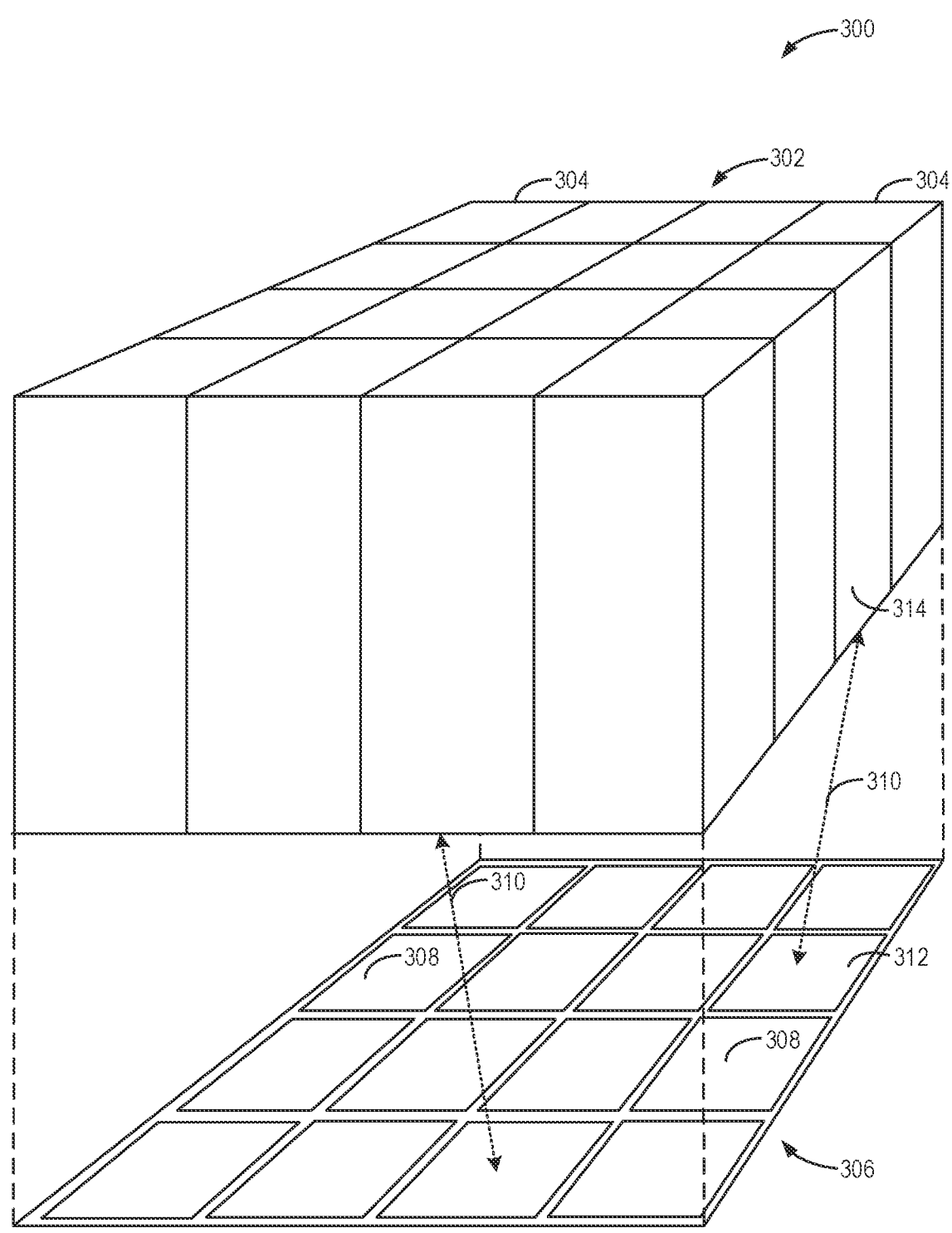
FIG. 3 is a schematic of an example detector block, according to an embodiment of the invention.
Figure 4:
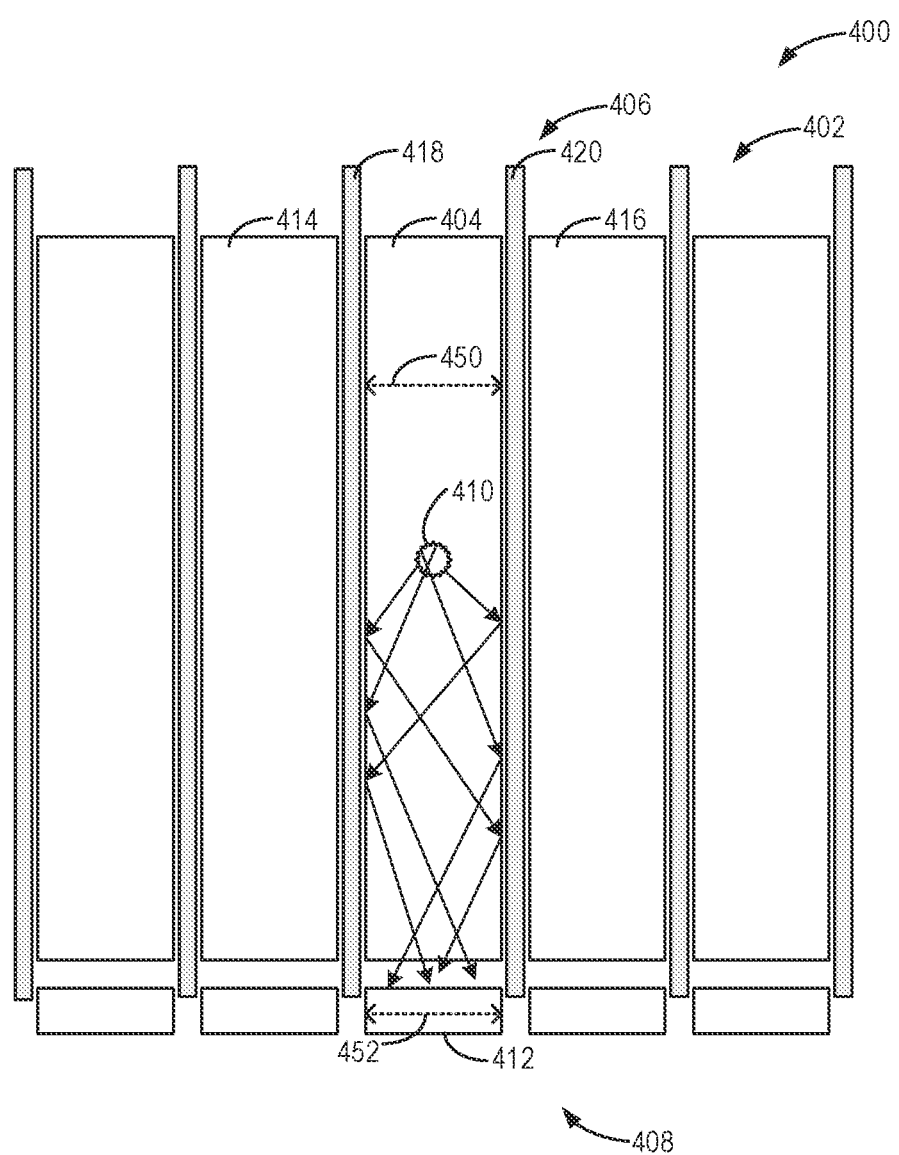
FIG. 4 is a schematic of a portion of an example detector block with separating reflectors, according to an embodiment of the present invention.
Figure 5A:
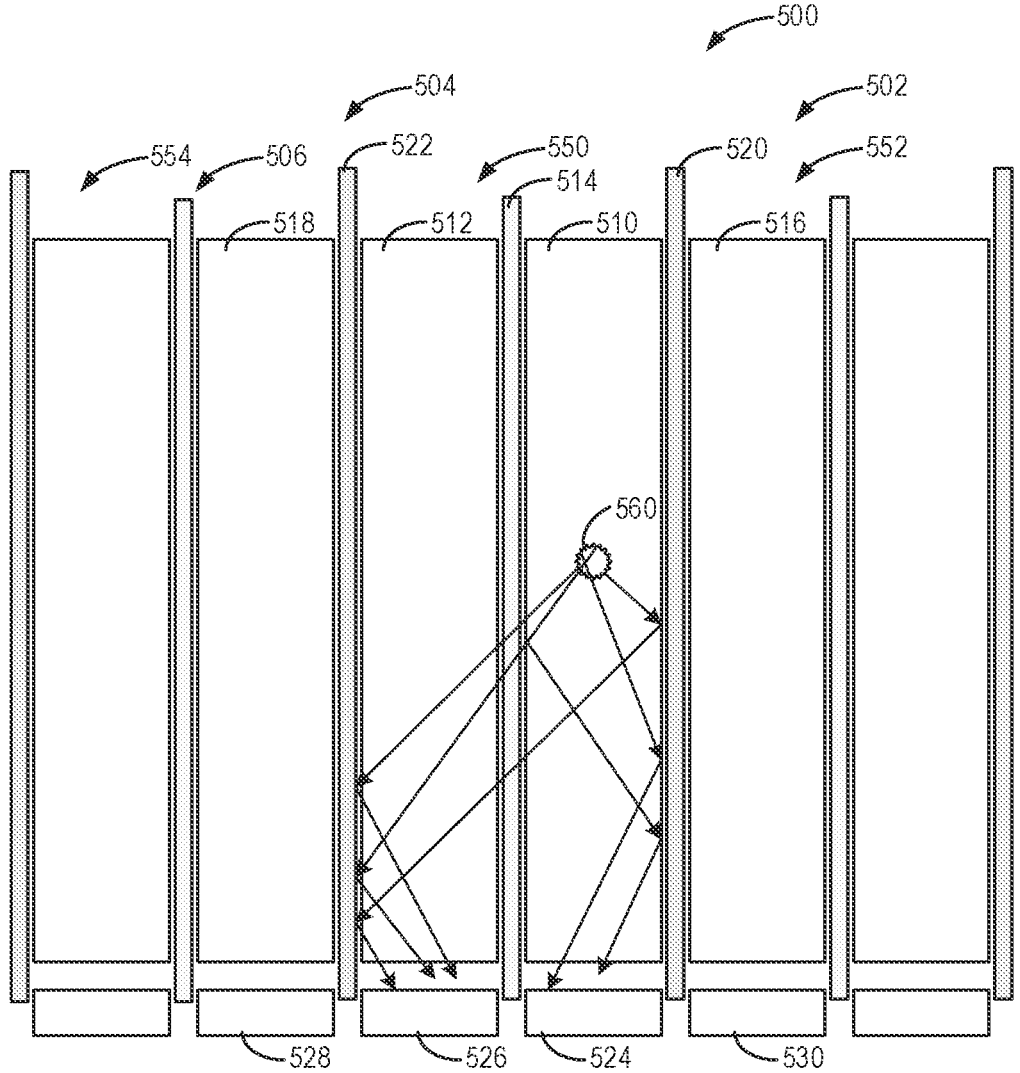
FIG. 5A is a schematic of a portion of an example detector block with light sharing reflectors and separating reflectors, according to an embodiment of the present invention.
Figure 5B:
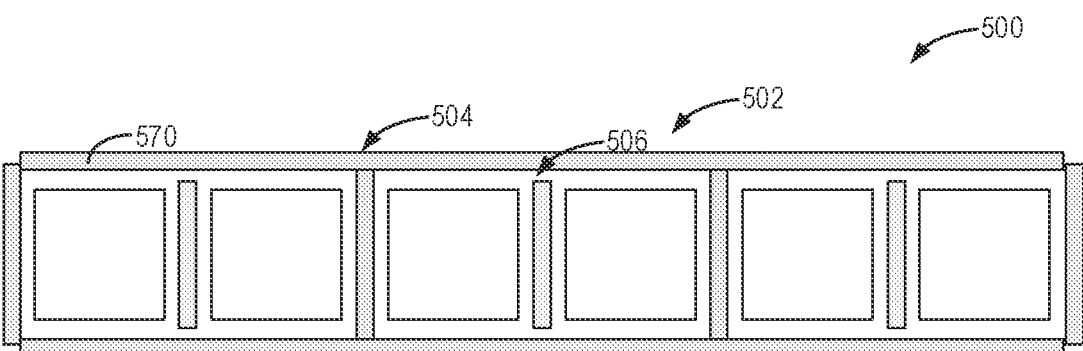
FIG. 5B is a schematic of the portion of the example detector block of FIG. 5A from a top-down view, according to an embodiment of the present invention.
Figure 6:
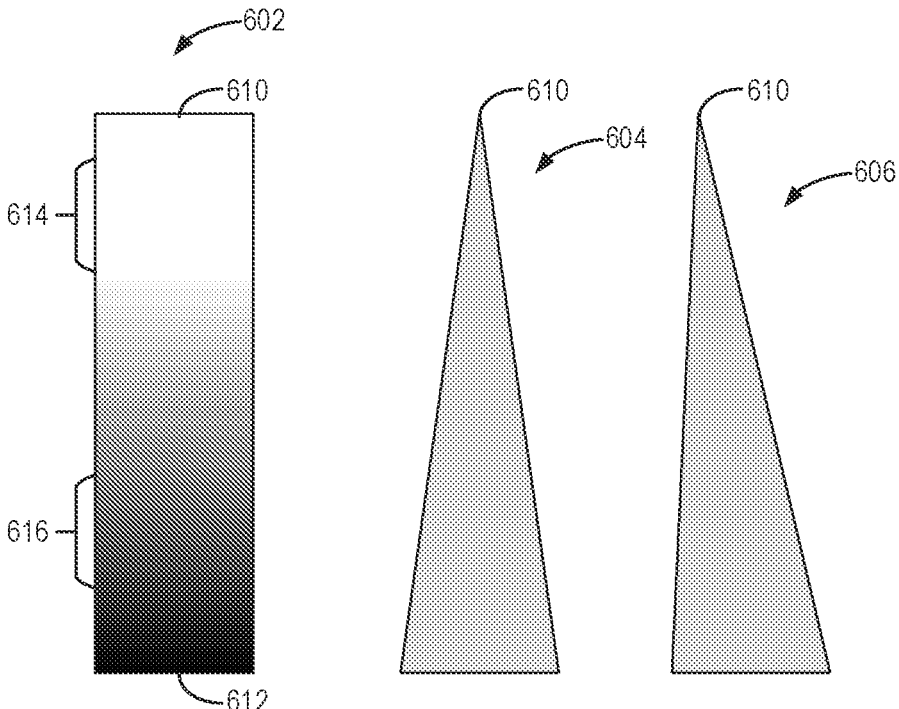
FIG. 6 shows schematic depictions of example light sharing reflectors.
Figure 7:
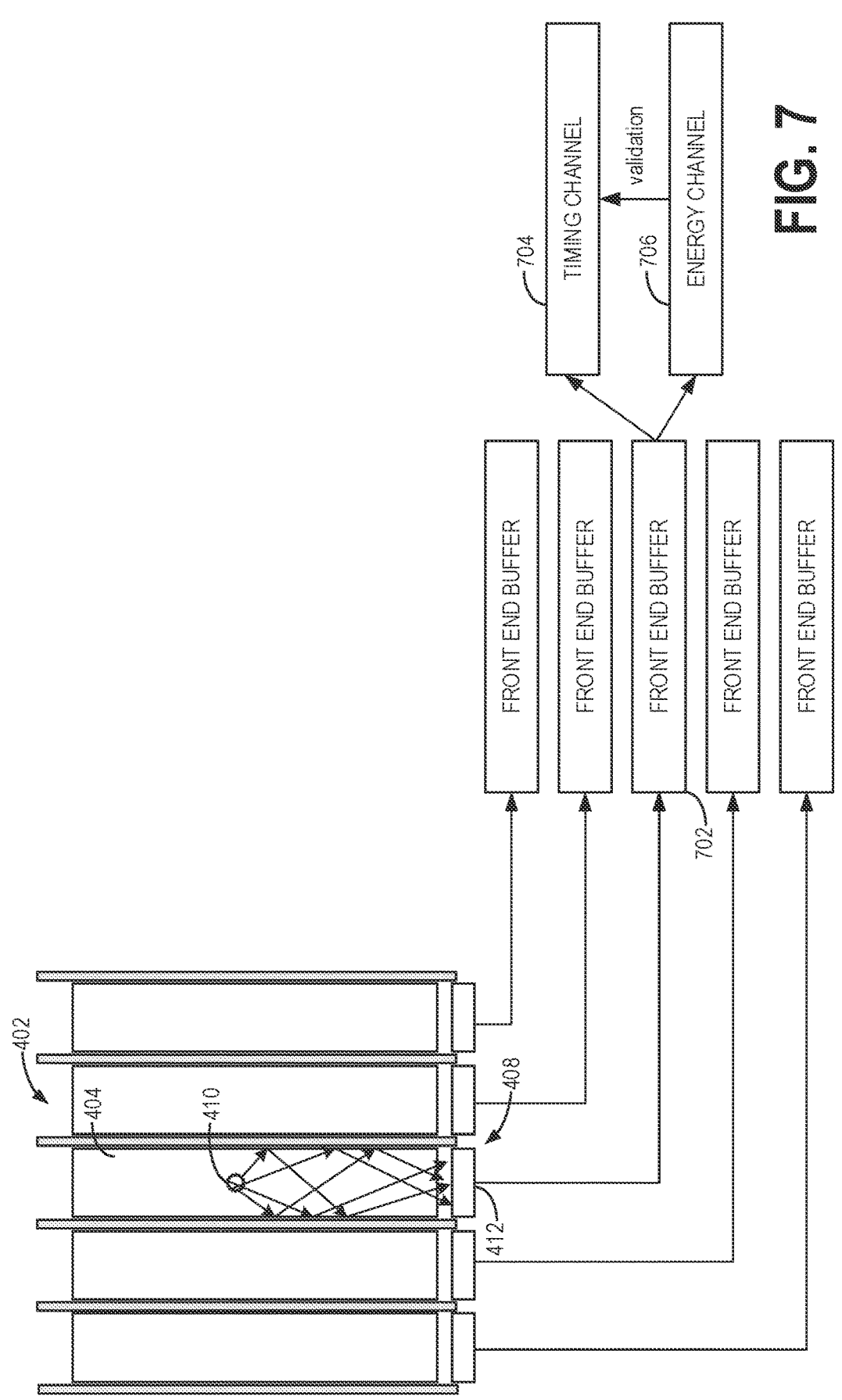
FIG. 7 is a block diagram of front-end readout circuits of the example detector block of FIG. 4, according to an embodiment of the present invention.
Figure 8:
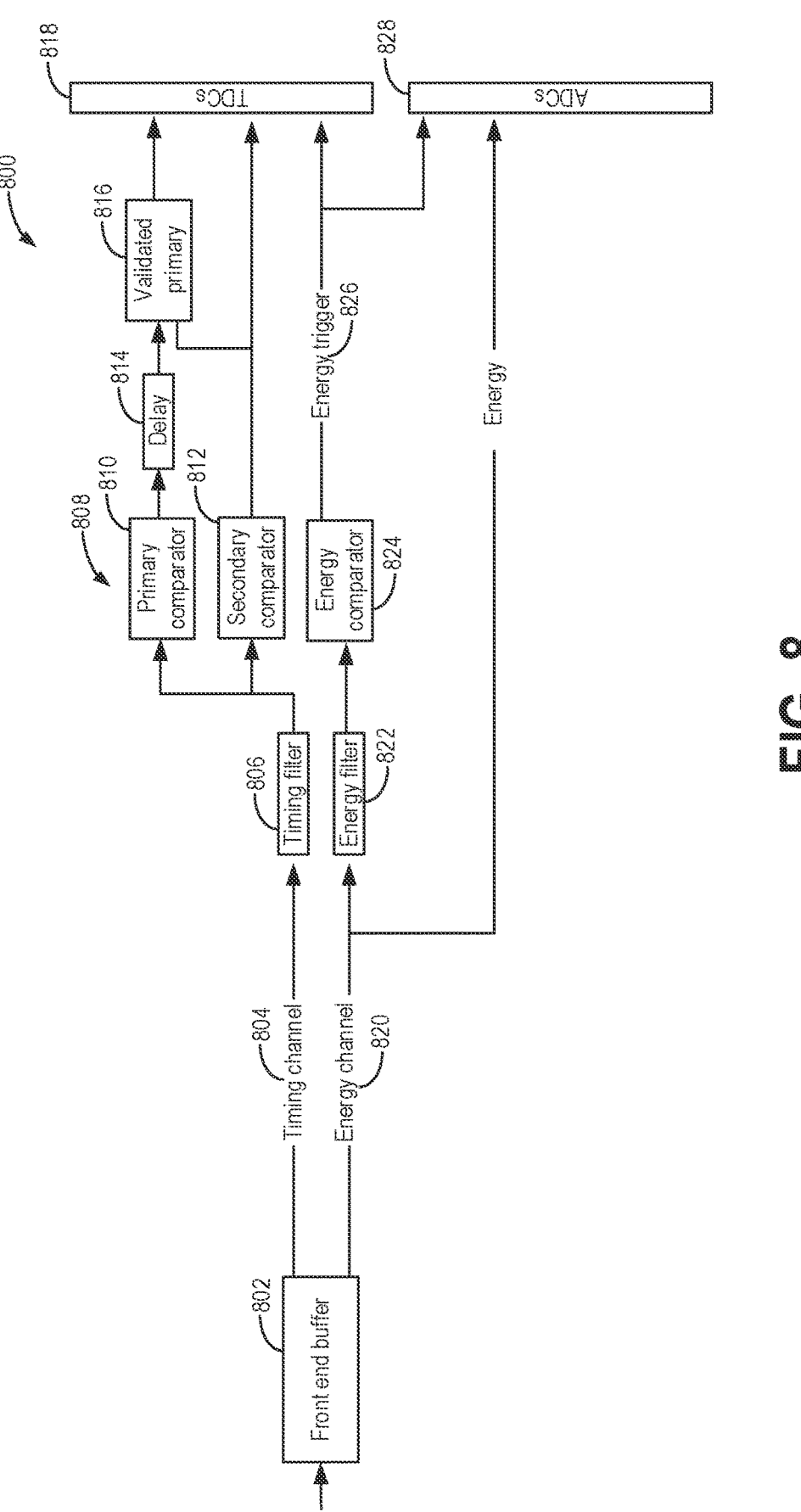
FIG. 8 is a high-level block diagram of an example readout circuit, according to an embodiment of the present invention.

The following description relates to various embodiments of medical imaging systems. In particular, systems and methods for a silicon photomultiplier (SiPM) based block detector and readout electronics thereof for a bismuth germanate oxide (BGO) time-of-flight (TOF) positron emission tomography (PET) system are provided. An example of a PET imaging system including a detector that may be used to detect energy events in accordance with the present technique is provided in FIGS. 1-2. An example detector block comprising an array of scintillation crystals and an array of SiPMs is shown in FIG. 3. A portion of a detector block with one-to-one coupling illustrating separating reflectors is shown in FIG. 4. A portion of a detector block with one-to-one coupling illustrating light sharing reflectors is shown in FIG. 5A. The detector block of FIG. 5A is shown in FIG. 5B from a top-down view. Examples of light sharing reflectors are illustrated in FIG. 6. A block schematic of the detector block of FIG. 4 with front-end readout circuits is shown in FIG. 7 and a detailed high-level schematic of a readout circuit thereof is shown in FIG. 8. A method of operation of the readout circuit shown in FIG. 8 is shown in a flowchart in FIG. 9.

In PET imaging, a chemical compound (e.g., a radioactive tracer) may be injected into a subject prior to performing a PET scan, where one or more atoms of the chemical compound have been replaced with a positron emitting radio-isotope. For example, the chemical compound may be glucose, or an analogous compound such as fluorodeoxy-glucose (FDG). The subject may be asked to wait for a period of time while the radioactive tracer is absorbed into and accumulates in tissues within a region of interest of the subject's body. For example, the region of interest may be a brain of the subject. The radioactive tracer may accumulate in higher concentrations around malignant tumor cells due to increased metabolic activity in malignant tumor cells, which results in increased glucose (or analogous compound) consumption. The absorption time may depend on various factors, and may be as short as a few minutes or as long as 90 minutes or more. After a predetermined waiting period, the subject may be placed within a PET scanner.

The radioactive tracer includes a positron emitting radio-nuclide that decays over time. As the radionuclide decays, positrons are emitted, which may collide with electrons after travelling a short distance (e.g., less than 1 mm). When a positron collides with an electron, the positron and electron are annihilated, producing two 511 keV photons travelling in opposite directions, referred to as gamma rays. The PET scanner may include arrays of detectors positioned around the subject that are capable of detecting the gamma rays. The PET scanner may also include coincidence circuitry (e.g., readout circuits) that measures a timing of pulses generated when a gamma ray is registered at a detector. If two gamma rays are registered by different detectors within a certain amount of time, it may be inferred that the two gamma rays were produced by the same annihilated positron (e.g., a coincidence event). When a coincidence event occurs, a line of response (LOR) connecting the first detector and the second detector may be determined. Based on the LOR, a location of the annihilation may be determined in a process known as electronic collimation.

TOF-PET may offer a reduction in statistical noise compared to conventional PET, though TOF-PET demands a high timing resolution. Timing resolution may in part be determined by intrinsic scintillation properties such as decay time, rise time, and light yield of the scintillator material. As herein referenced, decay time may be a time after which an intensity of a light pulse has returned to 1/e of its maximum value, rise time may be a speed with which the scintillator's light output grows once a gamma ray has been stopped in the crystal, and light yield may be a number of photons generated per unit energy deposited by a particle slowing down in the scintillating medium.

Other factors affecting timing resolution may include optical transfer time spread, depth of interaction, wherein gamma rays of an annihilation event are detected in scintillator at different distances from photosensor(s), optical transfer efficiency, photodetection efficiency, single-photon time resolution (SPTR), crosstalk, dark counts (e.g., responses of photonic detectors in the absence of light), and readout electronics noise, bandwidth, and transient response.

The annihilation gamma rays travel at a speed of about 30 cm/nanosecond. The time within which coincidence pairs are identified is called the coincidence timing window. A smaller coincidence timing window reduces the number of random coincidences collected by the scanner. The time-of-arrival measurement is dependent upon timing accuracy of the detector. Timing resolution (e.g., timing accuracy) is defined by a full width half maximum (FWHM) of the time-of-arrival differences from a point source of annihilation gamma rays. The FWHM may be the width of a bell curve of measured times of arrival at a height that is half of the value of the curve at its peak. Timing resolution may be applied in various aspects including to reduce accidentals (overlapped detection of two unrelated gamma rays) and for use in timing signals for localization purposes.

Single-photon time resolution (SPTR) accounts for precision in determining time of arrival of a single scintillating photon at a photosensor. In certain applications, particularly for low photon count applications like those that utilize Cherenkov detectors, SPTR may significantly influence timing resolution. BGO scintillator crystals emit Cherenkov light as a result from gamma ray interactions. Cherenkov light is produced when a charged particle travels through matter faster than the speed of light. Photoelectrons may emit Cherenkov light for approximately 1-20 ps. When a high energy gamma ray (e.g., 511 keV photon from a positron annihilation) interacts with BGO (a high Z scintillator material of a detector), photoelectrons with 420 keV may be produced in approximately 40% of a first interaction. These fast electrons may emit approximately 20 Cherenkov photons in a short period of time (e.g., 20 ps). Comparatively, a relatively small number of Cherenkov photons are produced per interaction, though the Cherenkov photons may significantly increase the average number of detected photons in the first few hundred ps of the events. Since the number of Cherenkov photons are small, with an average of 3-5 photons detected, readout electronics need to be triggered on the level below a single photoelectron (SPE) response and also estimate rise time in the first 100-500 ps (e.g., 1-5 nanoseconds) of a pulse.

Because of the demanded high timing resolution and scintillation properties, scintillators based on lutetium are commonly used for TOF PET systems, while BGO, with a longer decay time, has previously not been feasible for TOF under current timing resolution parameters. However, BGO scintillation crystal do emit Cherenkov light, as described above, therefore allowing for improved timing resolution in TOF PET applications that are capable of detecting Cherenkov light. A PET detector block for a BGO based PET system with TOF capability is herein presented.

In one example, a PET detector block may include arrays of SiPM devices and scintillation crystals with one-to-one coupling between scintillation crystals and SiPM devices, wherein each SiPM device has an independent readout circuit through which signals from the SiPM device are processed. All the crystals in the PET detector block may be optically isolated from each other and optically coupled to individual SiPM devices without any light sharing. In this way, light emitted by a crystal is sensed/detected by only the corresponding SiPM device. In one instance, the array of scintillation crystals may be partitioned into pairs of adjacent crystals that share light via light sharing reflectors to provide depth of interaction estimation.

Each SiPM device has an independent front-end readout circuit in the analog application-specific integrated circuit (ASIC). The front-end readout circuits of each SiPM device provide individual measurements of time stamps and signal amplitude or charges. Signals for timing and energy measurements are shaped by filters. A timing pick-off method implements multiple comparators for each signal to provide additional information about detected photons on the initial part of the scintillation pulses and corresponding rise time of each pulse, wherein the plurality of comparators are configured with a lowest timing pick-off threshold of ⅓ SPE, allowing for detection of Cherenkov photons. In this way, timing resolution in identification of events may be improved via detection of Cherenkov photons. Improvement in timing resolution for BGO based PET scanners may in turn result in increased image quality and sensitivity.

As used herein, the phrase "reconstructing an image" is not intended to exclude embodiments of the present invention in which data representing an image is generated but a viewable imaging is not. Therefore, as used herein, the term "image" broadly refers to both viewable images and data representing a viewable image. However, many embodiments generate, or are configured to generate, at least one viewable image.

Figure 1:
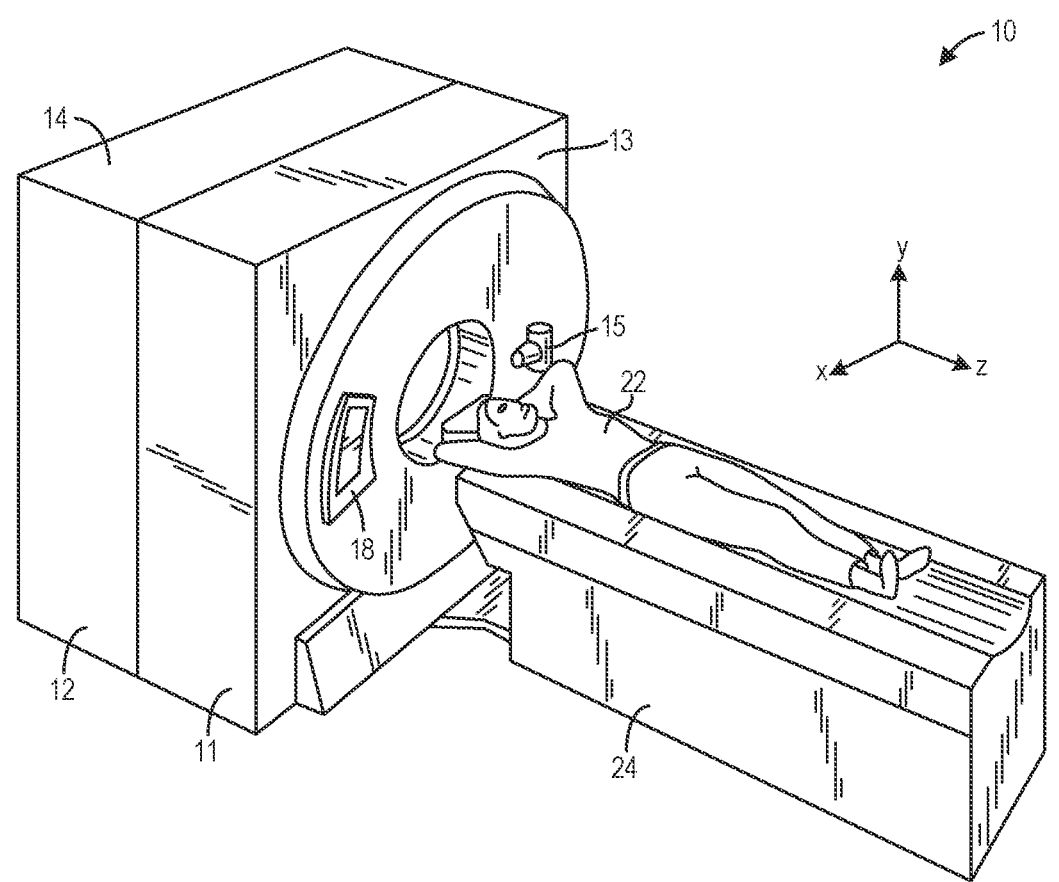
FIG. 1 is a pictorial view of an exemplary multi-modality imaging system according to an embodiment of the invention.
Figure 2:
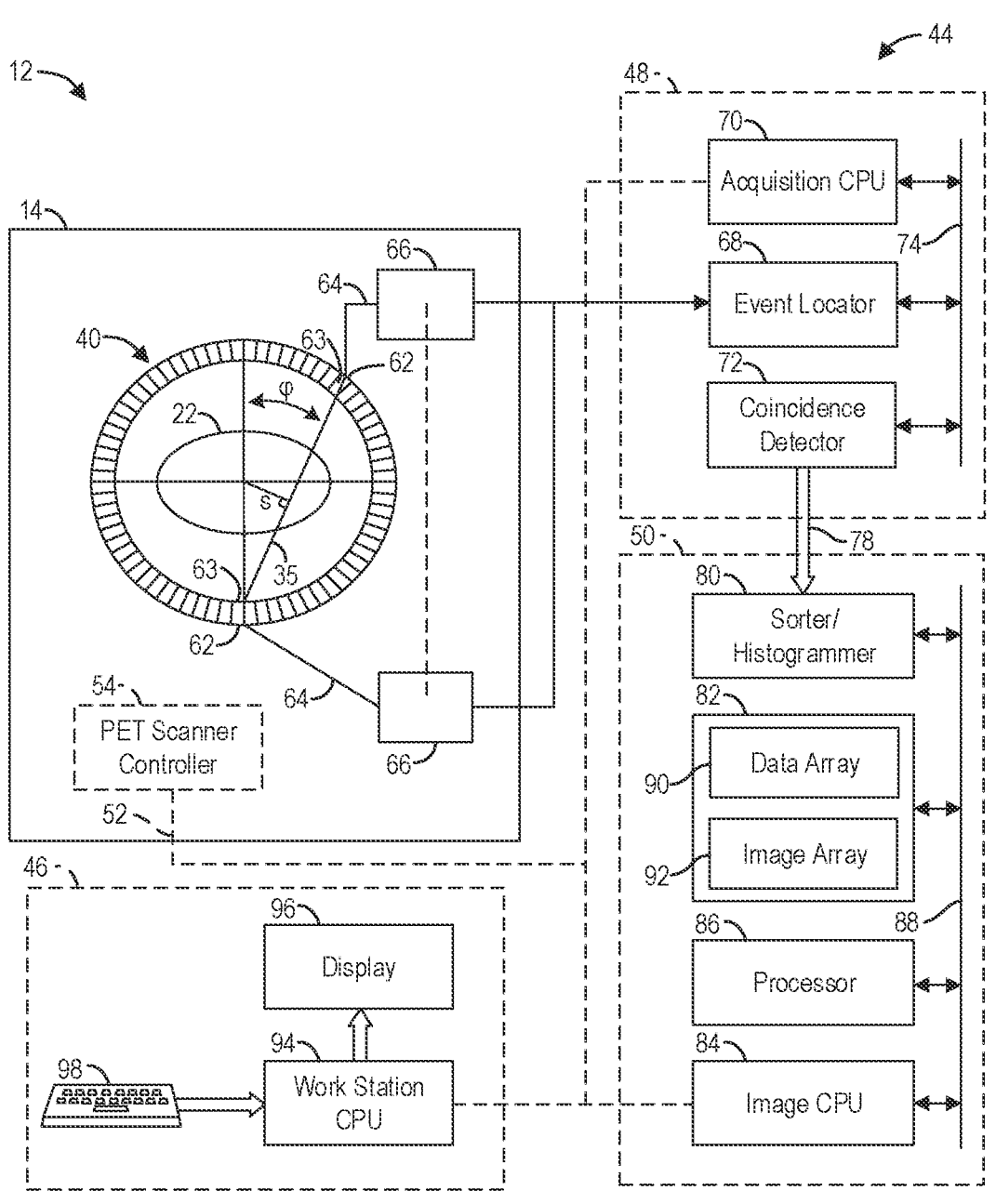
FIG. 2 is a block schematic diagram of an exemplary imaging system with a detector, according to an embodiment of the invention.

Various embodiments of the invention provide a multi-modality imaging system 10 as shown in FIGS. 1 and 2. Multi-modality imaging system 10 may be any type of imaging system, for example, different types of medical imaging systems, such as a Positron Emission Tomography (PET), a Single Photon Emission Computed Tomography (SPECT), a Computed Tomography (CT), an ultrasound system, Magnetic Resonance Imaging (MRI), or any other system capable of generating tomographic images. The various embodiments are not limited to multi-modality medical imaging systems, but may be used on a single modality medical imaging system such as a stand-alone PET imaging system, for example. Moreover, the various embodiments are not limited to medical imaging systems for imaging human subjects, but may include veterinary or non-medical systems for imaging non-human objects.

Referring to FIG. 1, the multi-modality imaging system 10 includes a first modality unit 11 and a second modality unit 12. The two modality units enable the multi-modality imaging system 10 to scan an object or patient in a second modality using the second modality unit 12. The multi-modality imaging system 10 allows for multiple scans in different modalities to facilitate an increased diagnostic capability over single modality systems. In one embodiment, multi-modality imaging system 10 is a Computed Tomography/Positron Emission Tomography (CT/PET) imaging system 10, e.g., the first modality 11 is a CT imaging system 11 and the second modality 12 is a PET imaging system 12. In some examples, the PET imaging system 12 may be a TOF PET system. The CT/PET system 10 is shown as including a gantry 13 representative of a CT imaging system and a gantry 14 that is associated with a PET imaging system. As discussed above, modalities other than CT and PET may be employed with the multi-modality imaging system 10.

The gantry 13 includes an x-ray source 15 that projects a beam of x-rays toward a detector array 18 on the opposite side of the gantry 13. Detector array 18 is formed by a plurality of detector blocks (not shown) including a plurality of detector elements which together sense the projected x-rays that pass through a medical patient 22. Each detector element produces an electrical signal that represents the intensity of an impinging x-ray beam and hence allows estimation of the attenuation of the beam as it passes through the patient 22. During a scan to acquire x-ray projection data, gantry 13 and the components mounted thereon rotate about a center of rotation.

FIG. 2 is a block schematic diagram of the PET imaging system 12 illustrated in FIG. 1 in accordance with an embodiment of the present invention. The PET imaging system 12 includes a detector ring assembly 40 including a plurality of detector blocks. The PET imaging system 12 also includes a controller or processor 44 to control normalization, image reconstruction processes and perform calibration. Controller 44 is coupled to an operator workstation 46. Controller 44 includes a data acquisition processor 48 and an image reconstruction processor 50, which are interconnected via a communication link 52. PET imaging system 12 acquires scan data and transmits the data to a data acquisition processor 48. The scanning operation is controlled from the operator workstation 46. The data acquired by the data acquisition processor 48 is reconstructed using the image reconstruction processor 50.

The detector ring assembly 40 includes a central opening, in which an object or patient, such as patient 22 may be positioned using, for example, a motorized table 24 (shown in FIG. 1). The motorized table 24 is aligned with the central axis of detector ring assembly 40. This motorized table 24 moves the patient 22 into the central opening of detector ring assembly 40 in response to one or more commands received from the operator workstation 46. A PET scanner controller 54, also referred to as the PET gantry controller, is provided (e.g., mounted) within PET system 12. The PET scanner controller 54 responds to the commands received from the operator workstation 46 through the communication link 52. Therefore, the scanning operation is controlled from the operator workstation 46 through PET scanner controller 54.

During operation, when a photon (e.g., a gamma ray) collides with a scintillation crystal 62 of a detector block 63 on a detector ring 40, it produces a scintillation event on the crystal. Each photomultiplier tube or photosensor (e.g., a SiPM device) produces an analog signal that is transmitted on communication line 64 when a scintillation event occurs. A set of acquisition circuits 66 (e.g., readout circuits) is provided to receive these analog signals. Acquisition circuits 66 produce digital signals indicating the three-dimensional (3D) location, total energy of the event, and the time or moment the scintillation event occurred. These digital signals are transmitted through a communication link, for example, a cable, to an event locator circuit 68 in the data acquisition processor 48.

The data acquisition processor 48 includes the event locator circuit 68, an acquisition CPU 70, and a coincidence detector 72. The data acquisition processor 48 periodically samples the signals produced by the acquisition circuits 66. The acquisition CPU 70 controls communications on a back-plane bus 74 and on the communication link 52. The event locator circuit 68 processes the information regarding each valid event and provides a set of digital numbers or values indicative of the detected event. For example, this information indicates when the event took place and the position of the scintillation crystal 62 or detector block 63 that detected the event. An event data packet is communicated to the coincidence detector 72 through the back-plane bus 74. The coincidence detector 72 receives the event data packets from the event locator circuit 68 and determines if any two of the detected events are in coincidence. Coincidence is determined by a number of factors. First, the time markers in each event data packet must be within a predetermined time period, for example, 5 nanoseconds, of each other. Second, a LOR 35 formed by a straight line joining the two detectors that detect the coincidence event should pass through the field of view in the PET imaging system 12. Events that cannot be paired are discarded. Coincident event pairs are located and recorded as a coincidence data packet that is communicated through a physical communication link 78 to a sorter/histogrammer 80 in the image reconstruction processor 50.

The image reconstruction processor 50 includes the sorter/histogrammer 80. During operation, sorter/histogrammer 80 generates a data structure known as a histogram. A histogram includes a large number of cells, where each cell corresponds to a unique pair of detector crystals in the PET scanner. Because a PET scanner typically includes thousands of detector crystals, the histogram typically includes millions of cells. Each cell of the histogram also stores a count value representing the number of coincidence events detected by the pair of detector crystals for that cell during the scan. At the end of the scan, the data in the histogram is used to reconstruct an image of the patient. The completed histogram containing all the data from the scan is commonly referred to as a "result histogram." The term "histogrammer" generally refers to the components of the scanner, e.g., processor and memory, which carry out the function of creating the histogram.

The image reconstruction processor 50 also includes a memory module 82, an image CPU 84, an array processor 86, and a communication bus 88. During operation, the sorter/histogrammer 80 counts all events occurring along each projection ray and organizes the events into 3D data. This 3D data, or sinogram, is organized in one exemplary embodiment as a data array 90. Data array 90 is stored in the memory module 82. The communication bus 88 is linked to the communication link 52 through the image CPU 84. The image CPU 84 controls communication through communication bus 88. The array processor 86 is also connected to the communication bus 88. The array processor 86 receives data array 90 as an input and reconstructs images in the form of image array 92. Resulting image arrays 92 are then stored in memory module 82.

The images stored in the image array 92 are communicated by the image CPU 84 to the operator workstation 46. The operator workstation 46 includes a CPU 94, a display 96, and an input device 98. The CPU 94 connects to communication link 52 and receives inputs, e.g., user commands, from the input device 98. The input device 98 may be, for example, a keyboard, mouse, a touch-screen panel, and/or a voice recognition system, and so on. Through input device 98 and associated control panel switches, the operator can control the operation of the PET imaging system 12 and the positioning of the patient 22 for a scan. Similarly, the operator can control the display of the resulting image on the display 96 and can perform image-enhancement functions using programs executed by the workstation CPU 94.

The detector ring assembly 40 includes a plurality of detector units (e.g., detector blocks). The detector unit may include a plurality of detectors (e.g., photosensors such as SiPM devices), light guides, scintillation crystals and ASICs, as will be further described in detail below. For example, the detector unit may include twelve SiPM devices, four light guides, and two or more analog ASICs. As another example, the detector unit may include between 16 and 64 SiPM devices, no light guides, and one or more ASICs.

As an example, the detector block 63 may include an array of scintillation crystals and an array of SiPM devices. The detector block 63 may be arranged with one-to-one coupling between scintillation crystals and SiPM devices, wherein each scintillation crystal is optically isolated from adjacent scintillation crystals via either a separating reflector or a light sharing reflector, as will be further described below. Each SiPM device may be read out by independent front-end readout circuits, via a timing pick-off channel and an energy channel. Signals from the timing pick-off channels and the energy channels may be sent ultimately to either Time-to-Digital converters (TDCs) or Analog-to-Digital converters (ADCs) after passing through one or more comparators.

Referring now to FIG. 3, a schematic depiction of an example PET detector block 300 is shown. The PET detector block 300 may be one of the plurality of detector units that comprise the detector ring assembly 40 of FIG. 2, for example the PET detector block 300 may be the detector block 63. In some examples, the PET detector block 300 may be configured with one-to-one coupling between scintillator crystals and SiPM devices.

The PET detector block 300 comprises an array of scintillation crystals 302 and an array of SiPM devices 306. In some examples, the scintillation crystals are BGO scintillation crystals. The array of scintillation crystals 302 comprises a plurality of crystals 304 and the array of SiPM devices 306 comprises a plurality of SiPM devices 308. In one example, there may be between 16 and 64 SiPM devices and scintillation crystals per detector block. Each of the plurality of crystals 304 is optically coupled to one of the plurality of SiPM devices 308, as is shown via coupling lines 310. In some examples, each of the plurality of crystals 304 may be optically isolated from one another, as is depicted in FIG. 4. In other examples, pairs of crystals share light while being optically isolated from other adjacent crystals, as is depicted in FIG. 5A.

As an example, a first scintillation crystal 314 may be optically coupled to a first SiPM device 312 such that when one or more gamma rays collide with (e.g., are stopped within) the first scintillation crystal 314, the first SiPM device 312 detects the produced light from the first scintillation crystal 314 and sends signals to be read by a corresponding readout circuit.

While not shown in FIG. 3, the PET detector block 300 may be surrounded by a reflective film (e.g., Teflon or other specular or diffusive material). The reflective film may be a light tight cover that does not allow emitted light from scintillation crystals to pass therethrough.

As is shown in FIG. 4, in a first embodiment, each crystal of an array of scintillation crystals of a detector block as herein disclosed may be optically isolated from each other. FIG. 4 specifically depicts a schematic lateral view of a portion of a detector block 400, illustrating a row of scintillation crystals 402 within the array. Each scintillation crystal within the row of scintillation crystals 402 may be optically coupled to one SiPM device of a row of SiPM devices 408. As with the crystals and SiPM devices of FIG. 3, the scintillation crystals herein described may be BGO scintillation crystals.

Each SiPM device within the detector block 400 may have dimensions equal to dimensions of a corresponding scintillation crystal. For example, a first scintillation crystal 404 may have a first width 450 and a first SiPM device 412 may have a second width 452. The first width 450 and the second width 452 may be equal to each other. In a similar fashion, an area of an end of the first scintillation crystal 404 may be equal to an area of an end of the first SiPM device 412. In this way, each of the SiPM devices may be configured for optical coupling to one of the crystals without overlap between.

The detector block 400 may further comprise a plurality of separating reflectors 406. Each of the separating reflectors 406 may be positioned directly adjacent to one of the scintillation crystals 402. The plurality of separating reflectors 406 may be configured to optically isolate adjacent scintillation crystals from one another such that each scintillation crystal, in response to a photon being stopped therewithin, emits light to only one SiPM device. For example, the first scintillation crystal 404 may be adjacent to a second scintillation crystal 414 and a third scintillation crystal 416. The first scintillation crystal 404 may be positioned between the second and third scintillation crystals 414, 416. A first separating reflector 418 may be positioned between the first scintillation crystal 404 and the second scintillation crystal 414 and a second separating reflector 420 may be positioned between the first scintillation crystal 404 and the third scintillation crystal 416.

When a gamma ray 410 (e.g., a photon) interacts with the first scintillation crystal 404, light is emitted, illustrated in FIG. 4 by arrows emitting from the gamma ray 410 within the first scintillation crystal 404. The first and second separating reflectors 418 and 420 may reflect the emitted light such that the light is not shared with the second and third scintillation crystals 414 and 416. Thus, the light may be sensed by the first SiPM device 412 and not with any adjacent SiPM devices. In this way, signals produced by the first SiPM device 412 may be known for gamma rays interacting with the first scintillation crystal 404.

As shown in FIG. 5A, in a second embodiment, pairs of adjacent scintillation crystals may share light while being optically isolated from other scintillation crystals in an array of crystals. FIG. 5A specifically depicts a schematic lateral view of a portion of a detector block 500, illustrating a row of scintillation crystals 502 within the array. The row of scintillation crystals 502 may be partitioned into pairs of scintillation crystals, for example a first pair of crystals 550 may comprise a first crystal 510 and a second crystal 512

The detector block 500 may further comprise a plurality of separating reflectors 504 and a plurality of light sharing reflectors 506, wherein each pair of crystals is optically isolated from adjacent pairs by one of the plurality of separating reflectors 504 and each of the plurality of light sharing reflectors 506 is positioned between crystals of a pair of crystals. Each of the plurality of light sharing reflectors 506 may be configured to allow emitted light to pass through and provide depth of interaction information/estimation to readout electronics in communication with SiPM devices.

As an example, the first crystal 510 and the second crystal 512 of the first pair of crystals 550 may be separated by a light sharing reflector 514 such that light emitted by either the first or second crystal 510, 512 may be shared with the other of the first and second crystals 510, 512. The first crystal 510 may be adjacent to a third crystal 516 that is one of a second pair of crystals 552. The first crystal 510 may be optically separated from the third crystal 516 by a first separating reflector 520 such that light emitted by the first crystal 510 does not share with the third crystal 516. The second crystal 512 may be adjacent to a fourth crystal 518 that is one of a third pair of crystals 554. The second crystal 512 may be optically separated from the fourth crystal 518 by a second separating reflector 522.

When a gamma ray 560 interacts with the first crystal 510, light is emitted. Because the first pair of crystals 550 are able to share light via the light sharing reflector 514, emitted light may be shared with the second crystal 512 and thus light may be sensed by both a first SiPM device 524 that is optically coupled to the first crystal 510 and a second SiPM device 526 that is optically coupled to the second crystal 512. Conversely, light may not be shared with the third crystal 516 or the fourth crystal 518 due to the first and second separating reflectors 520 and 522 and thus neither a third SiPM device 530 that is optically coupled to the third crystal 516 and a fourth SiPM device 528 that is optically coupled to the fourth crystal 518 may sense the light emitted by the first crystal 510.

Having more than one SiPM device sense light emitted by a crystal may allow for increased depth of information relayed through individual readout electronics. In some examples, the amount of light shared may depend upon a location of the interaction between the gamma ray (e.g., gamma ray 560) and the scintillation crystal (e.g., the first crystal 510), for example a height within the crystal and/or a lateral position within the crystal. By measuring the signals from the SiPM devices that detect the emitted light (e.g., first SiPM device 524 and second SiPM device 526), depth of interaction information may be determined and used for timing measurement correction. As will be described further with respect to FIG. 7, each SiPM device, in either the first or second embodiment, may have individual front-end readout circuits and as such with two SiPM devices providing information to the front-end readout circuits, depth of interaction with regards to time of detection correction may be determined.

FIG. 5B schematically depicts the detector block 500 of FIG. 5A from a top-down view. In some examples, the row of scintillation crystals 502 may be one of a plurality of rows of scintillation crystals within the array of crystals. For example, four rows of six scintillation crystals may comprise an array. Each row of scintillation crystals may be optically isolated from one another. As shown in FIG. 5B, pairs of crystals are optically isolated from one another via the plurality of separating reflectors 504 and crystals of each pair are separated by light sharing reflectors 506.

Additional separating reflectors 570 may be positioned perpendicular to the plurality of separating reflectors 504. In some examples, the additional separating reflectors 570 may optically isolate rows of scintillation crystals from one another, such that the row of scintillation crystals 502 does not share light with adjacent row(s). In other examples, the additional separating reflectors 570 optically isolates the row of scintillation crystals from other arrays of crystals when the row of scintillation crystals is at a border of the array. In this way, light emitted from a crystal may be directed towards respective target SiPM devices and not to untargeted SiPM devices or other arrays, thereby maintaining information about location of gamma rays and annihilation events.

Turning now to FIG. 6, schematic depictions of examples of light sharing reflectors as may be used in the detector block 500 of FIGS. 5A and 5B are shown, including a first example light sharing reflector 602, a second example light sharing reflector 604, and a third example light sharing reflector 606.

The first example light sharing reflector 602 may share light based on varying levels of reflectivity and transparency. For example, a first end 610 of the first example light sharing reflector 602 may reflect all light while a second end 612 of the first example light sharing reflector 602 transmits all light. Between the first end 610 and the second end 612, amounts (e.g., percentages) of light reflection and transmission may gradually change. For example, a first region 614 that is closer to the first end 610 may reflect more light and transmit less light than a second region 616 that is closer to the second end 612. In some examples, the varying levels may be based on or otherwise depend on height, wherein regions further from a detector block reflect or transmit more light than regions closer to the detector block.

The second and third example light sharing reflectors 604 and 606, in comparison to the first example light sharing reflector 602, may have an even amount of light reflection/transmission throughout, but may be shaped with a taper towards one end (e.g., the first end 610) such that portions of one or more corresponding scintillation crystals are not blocked (e.g., reflected) by the light sharing reflector. In this way, with any of the aforementioned light sharing reflectors, light may be shared between adjacent crystals. The configurations of the light sharing reflector may be known such as to provide additional depth of interaction estimation for an interaction between a gamma ray and a scintillation crystal. For example, measurements taken by corresponding SiPM devices may provide information of location of the interaction and therefore allow for time measurement correction.

Turning now to FIG. 7, individual, independent front-end readout circuits of SiPM devices of the detector block 400 are shown in a block diagram. Each SiPM device of the row of SiPM devices 408 and of an array of SiPM devices comprised of a plurality of rows of SiPM devices may have independent front-end readout circuits. The readout electronics, including the front-end buffers (e.g., front-end amplifiers) as depicted in FIG. 7 may be part of one or more ASICs. Each of the front-end buffers, such as front-end buffer 702, may provide signals for individual measurements of time stamps (e.g., time of detection/arrival of annihilation event) via a timing pick-off channel, such as timing channel 704. Each of the front-end buffers may also provide individual signals for measurements of energy, such as signal amplitudes and/or charges, via an energy channel, such as energy channel 706. Each of the timing and energy measurements may be shaped by filters. In some examples, an optimal timing filter may shape pulse signal to preserve rise time but quickly restore baseline, so time pick-off circuitry of timing channel can precisely detect timing of pulse. An optimal filter of energy channel may filter out high frequencies of a signal, to improve measurement of total signal charge, which corresponds to energy deposited in the crystal.

For example, when the gamma ray 410 interacts with the first scintillation crystal 404 and light is emitted therefrom, the first SiPM device 412 may detect the light and send analog signals to the front-end buffer 702 for timing and energy channels. These signals may be sent through timing and energy channels, respectively, towards one or more comparators, TDCs, and ADCs as shown in FIG. 8.

FIG. 8 shows a high-level block diagram of readout circuit 800 for a SiPM device. The readout circuit 800 may receive signals from the SiPM device when the SiPM device detects light from scintillation crystals as previously described. In some examples, the scintillation crystals may be BGO scintillation crystals and the light may include Cherenkov light with detectable Cherenkov photons. A PET detector block with a plurality of SiPM devices therein may include a plurality of readout circuitries, one for each of the SiPM devices and each SiPM device may read out independent of other SiPM devices. A method for signal processing via the readout circuit 800 is presented in FIG. 9.

The readout circuit 800 of the SiPM may comprise a front-end buffer 802 that is communicatively coupled to both a timing pick-off circuit and an energy circuit. The timing pick-off circuit may comprise a timing channel 804 in communication (e.g., connected in series) with the front-end buffer 802. The timing channel 804 may also be in communication with a timing filter 806, such as a timing filter, through which pulse may be shaped. The timing channel 804 and the timing filter 806 may further be in communication with a plurality of comparators 808. The plurality of comparators 808 may comprise a first comparator 810 (e.g., a primary comparator 810) and a second comparator 812 (e.g., a secondary comparator 812). The plurality of comparators 808 may allow for additional information regarding pulse rise time, wherein the signal passed through each of the plurality of comparators 808 is compared to a threshold signal. In some examples, the thresholds may be in a range of ⅓ to 10 SPE for timing pick-off. The comparators may also provide dark count suppression (e.g., threshold of 1.5 SPE). The first comparator 810 may be in communication with a delay circuit 814 and generate a validated primary signal 816 when secondary comparator detects signal above threshold during delay. Both the first comparator 810 and the second comparator 812 may be in communication with one or more TDCs 818. In this way, the readout circuit 800, and other readout circuits of the PET system herein described, may be triggered at a first level of ⅓ single photoelectron (SPE) and validated at a second level of 1.5 SPE.

The energy circuit of the readout circuit 800 may comprise an energy channel 820 that is in communication with an energy filter 822, such as an energy filter through which pulse may be shaped, and with one or more ADCs 828. The energy filter 822 may be in communication with an energy comparator 824 of the plurality of comparators 808, which may compare the signal energy (e.g., signal amplitude and charges) with a threshold. The energy comparator 824 may be in communication with an energy trigger 826 which is in communication with both the one or more TDCs 818 and the one or more ADCs 828. The one or more TDCs 818 and the one or more ADCs 828 may digitize time-of-arrival, rise time (e.g., with multiple time stamps), and energy information (e.g., amplitude, charge, etc.).

As noted, the readout circuit 800 is an example of one readout circuitry of a PET system in accordance with the present disclosure. Each SiPM device of a PET detector may have individual readout circuits such that multiple readout circuitries are included in the PET system. In this way, thresholds of the comparators may be reduced as multiplexing signals from multiple SiPM devices demands a higher threshold than is demanded with individual readout circuits. Thus, each SiPM device may have TDCs and ADCs, thereby providing improved timing resolution. Additionally, in some examples, reconstruction of the signal rise time as provided by the filters and multiple timing measurements may include separation of events into two categories: "fast" and "slow".

FIG. 9 shows a flowchart illustrating an example method 900 for signal processing via the readout circuit 800 described with respect to FIG. 8. Method 900 may be carried out using the systems and components described herein above with regard to FIGS. 1-8. For example, method 900 may be accomplished by a combination of a PET detector block (e.g., detector block 300, detector block 400, and/or detector block 500) and an analog ASIC comprising readout electronics (e.g., readout circuit 800) communicatively coupled to SiPM devices of the PET detector block. However, it should be understood that the method may be carried out using different systems and components without departing from the scope of the disclosure.

At 902, method 900 includes generating an analog signal at a SiPM device (e.g., first SiPM device 412 of FIG. 4) of a detector block corresponding to a scintillation event within a scintillation crystal coupled to the SiPM device. As described previously, the detector block may comprise a plurality of SiPM devices arranged in an array with a one-to-one coupling arrangement with scintillation crystals arranged in a corresponding array. When a gamma ray collides with the scintillation crystal that is coupled to the SiPM device, a scintillation event is produced and light as photons, including Cherenkov photons for BGO scintillation crystals as herein included, is emitted. The emitted light of the scintillation event is detected by the SiPM device and the SiPM device produces the analog signal of the scintillation event. The analog signal may include information about time-of-arrival, rise time, amplitude, charge, and/or others.

At 904, method 900 includes transmitting the signal from the SiPM to a front-end buffer of an ASIC. Each SiPM of the detector block may be in communication with an individual front-end buffer and therefore a plurality of front-end buffers may be included in the ASIC.

At 906, method 900 includes transmitting the signal into a timing pick-off circuit and an energy circuit. As described, the timing pick-off circuit may comprise a timing channel (e.g., timing channel 804) in communication with a timing filter (e.g., timing filter 806) and the energy circuit may comprise an energy channel (e.g., energy channel 820) in communication with an energy filter (e.g., energy filter 822).

At 908, method 900 includes shaping the signal via the timing filter and the energy filter. The signal may be transmitted through the energy channel to the energy filter and through the timing channel to the timing filter. The energy filter and the timing filter may be optimal filters that may change pulse shape allowing the timing and energy pulses from the front-end buffer to be compatible with digitizing electronics of each channel (e.g., comparators, TDCs, and ADCs).

At 910, method 900 includes transmitting the shaped signals through a plurality of comparators. The plurality of comparators may comprise a first comparator, a second comparator, and an energy comparator. The first and secondary comparators may compare timing signals against thresholds, such as a range of ⅓ to 10 SPE for time pick-off. Further, rise time may be estimated in the first nanosecond, by measuring delay between primary and secondary comparators outputs. The energy comparator may compare pulse amplitude and/or charge inputs to thresholds or predefined input charges to generate an output signal.

The configurations of the plurality of comparators may allow for improved timing resolution by way of reducing the threshold and increasing ability to detect first photon of scintillation event. BGO scintillation crystals, by nature of emitting Cherenkov photons, may produce detectable light that falls within the threshold ranges and therefore with the timing pick-off method as herein described with the plurality of comparators, Cherenkov photons may be detected and timing resolution may be improved.

At 912, method 900 includes transmitting signals validated and/or generated by the plurality of comparators to TDCs and/or ADCs. As described with respect to FIG. 8, the readout circuitry may comprise one or more TDCs (e.g., one or more TDCs 818) and one or more ADCs (e.g., one or more ADCs 828).

At 914, method 900 includes producing a digital signal corresponding to the scintillation event. The one or more TDCs may measure the timing signal (e.g., signal of time-of-arrival and/or rise time and convert the signal time to a digital signal for further processing. The one or more ADCs may measure the energy signal output from the energy channel sent to ADCs after passing through the energy filter and converts to a digital signal. One or more digital signals may be produced by the TDCs and ADCs corresponding to the scintillation event, the one or more digital signals may provide information of time-of-arrival, rise time estimation, energy amplitude, energy charge, etc.

At 916, method 900 includes transmitting the digital signal to a data acquisition processor (e.g., data acquisition process 48 of FIG. 2) for localization. The data acquisition processor may use the digital signal, along with other digital signals transmitted and converted from other SiPM devices of a detector ring, to localize annihilation events within a patient being imaged by the PET system. Improved timing resolution as herein described may allow for decreased margin of localization of events and therefore higher image quality.

A technical effect of the systems and methods described herein is that Cherenkov photons may be detected with high timing resolution via the readout circuitry that includes a plurality of comparators and one or more filters and thus BGO scintillation crystals may be implemented into TOF PET systems. Thresholds for comparators within the circuitry may be set to ⅓ SPE with validation at 1.5-2.5 SPE, therefore suppressing dark counts while detecting emitted Cherenkov light for increased timing resolution.

The disclosure also provides support for an imaging system, comprising: a detector block including an array of silicon photomultiplier (SiPM) devices coupled to a crystal in an array of scintillation crystals with a one-to-one coupling arrangement, wherein each SiPM device of the array of SiPM devices transmits signals to independent front-end readout circuits of one or more analog application-specific integrated circuits (aSICs). In a first example of the system, the detector block forms a portion of a detector ring assembly of the imaging system. In a second example of the system, optionally including the first example, each of the scintillation crystals is optically isolated from each other in the array of scintillation crystals via separating reflectors. In a third example of the system, optionally including one or both of the first and second examples, the array of scintillation crystals includes pairs of adjacent scintillation crystals that share light via light sharing reflectors and the pairs are optically isolated from one another via separating reflectors. In a fourth example of the system, optionally including one or more or each of the first through third examples, information from the pairs of adjacent scintillation crystals provides depth of interaction estimation. In a fifth example of the system, optionally including one or more or each of the first through fourth examples, the depth of interaction estimation is applied for timing measurement correction. In a sixth example of the system, optionally including one or more or each of the first through fifth examples, each independent front-end readout circuit comprises a plurality of comparators and one or more filters. In a seventh example of the system, optionally including one or more or each of the first through sixth examples, the plurality of comparators comprises a first comparator, a second comparator, and an energy comparator. In a eighth example of the system, optionally including one or more or each of the first through seventh examples, the plurality of comparators are configured with a lowest timing pick-off threshold of ⅓ single photoelectron (SPE). In a ninth example of the system, optionally including one or more or each of the first through eighth examples: the array of scintillation crystals is an array of bismuth germanate oxide (BGO) scintillation crystals, each BGO scintillation crystal configured to emit Cherenkov light, and each of the SiPM devices are configured to sense the Cherenkov light emitted by a corresponding scintillation crystal. In a tenth example of the system, optionally including one or more or each of the first through ninth examples, each independent front-end readout circuit comprises one or more Time-to-Digital converters (TDCs) and one or more analog to digital converters (ADCs) configured to digitize time-of-arrival, rise time, and energy signals from a corresponding SiPM device. In an eleventh example of the system, optionally including one or more or each of the first through tenth examples, each independent front-end readout circuit is configured for dark count suppression at 1.5 SPE.

The disclosure also provides support for a method for an imaging system, comprising: sensing light emitted by a scintillation crystal via a silicon photomultiplier (SiPM) device of a detector block in response to an annihilation event, transmitting an analog signal from the SiPM device to a front-end buffer of a readout circuit, shaping the analog signal with one or more filters of the readout circuit, comparing the analog signal to one or more thresholds via a plurality of comparators of the readout circuit, and digitizing the analog signal with one or more time to digital converters (TDCs) and one or more analog to digital converters (aDCs). In a first example of the method, the method further comprises: validating the analog signal to suppress dark counts. In a second example of the method, optionally including the first example, the SiPM device is one of a plurality of SiPM devices in an array, wherein each SiPM device in the array is readout by individual readout circuits. In a third example of the method, optionally including one or both of the first and second examples, the analog signal comprises a timing signal and an energy signal, the timing signal shaped by a timing filter of the one or more filters and the energy signal shaped by an energy filter of the one or more filters.

The disclosure also provides support for a time of flight (TOF) positron emission tomography (PET) system, comprising: a detector ring including a plurality of detector blocks, each detector block in the plurality of detector blocks including an array of silicon photomultiplier (SiPM) devices, each SiPM device in the array coupled to one scintillation crystal of an array of scintillation crystals, wherein each crystal of the array of scintillation crystals is configured to emit Cherenkov light in response to interaction with a gamma ray, and readout electronics including a front-end readout circuit for each of SiPM devices in the array of SiPM devices, wherein the readout electronics are configured to readout signals of detected Cherenkov light. In a first example of the system, each of the array of scintillation crystals is a bismuth germanate oxide (BGO) scintillation crystal. In a second example of the system, optionally including the first example, each front-end readout circuit comprises a front-end buffer, a timing pick-off circuit, and an energy circuit, wherein the timing pick-off circuit comprises a plurality of comparators configured to estimate rise time within 1-5 nanoseconds of a pulse. In a third example of the system, optionally including one or both of the first and second examples, the readout electronics are configured to be triggered at a first level of ⅓ single photoelectron (SPE) and validated at a second level of 1.5 SPE.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An imaging system, comprising:
a detector block including an array of silicon photomultiplier (SiPM) devices coupled to a crystal in an array of scintillation crystals with a one-to-one coupling arrangement, wherein each SiPM device of the array of SiPM devices transmits signals to independent front-end readout circuits of one or more analog application-specific integrated circuits (ASICs), wherein each independent front-end readout circuit comprises a plurality of comparators and one or more filters, wherein the plurality of comparators are configured with a lowest timing pick-off threshold of ⅓ single photoelectron (SPE).

2. The imaging system of claim 1, wherein the detector block forms a portion of a detector ring assembly of the imaging system.

3. The imaging system of claim 1, wherein each of the scintillation crystals is optically isolated from each other in the array of scintillation crystals via separating reflectors.

4. The imaging system of claim 1, wherein the array of scintillation crystals includes pairs of adjacent scintillation crystals that share light via light sharing reflectors and the pairs are optically isolated from one another via separating reflectors.

5. The imaging system of claim 4, wherein information from the pairs of adjacent scintillation crystals provides depth of interaction estimation.

6. The imaging system of claim 5, wherein the depth of interaction estimation is applied for timing measurement correction.

7. The imaging system of claim 1, wherein the plurality of comparators comprises a first comparator, a second comparator, and an energy comparator.

8. The imaging system of claim 1, wherein:
the array of scintillation crystals is an array of bismuth germanate oxide (BGO) scintillation crystals, each BGO scintillation crystal configured to emit Cherenkov light; and
each of the SiPM devices are configured to sense the Cherenkov light emitted by a corresponding scintillation crystal.

9. The imaging system of claim 1, wherein each independent front-end readout circuit comprises one or more Time-to-Digital converters (TDCs) and one or more analog to digital converters (ADCs) configured to digitize time-of-arrival, rise time, and energy signals from a corresponding SiPM device.

10. The imaging system of claim 8, wherein each independent front-end readout circuit is configured for dark count suppression at 1.5 SPE.

11. A method for an imaging system, comprising:
sensing light emitted by a scintillation crystal via a silicon photomultiplier (SiPM) device of a detector block in response to an annihilation event;
transmitting an analog signal from the SiPM device to a front-end buffer of a readout circuit;
transmitting the analog signal through an energy channel to an energy filter of the readout circuit and through a timing channel to a timing filter of the readout circuit;
shaping the analog signal with the energy filter and the timing filter of the readout circuit;
comparing the analog signal to one or more thresholds via a plurality of comparators of the readout circuit; and
digitizing the analog signal with one or more time to digital converters (TDCs) and one or more analog to digital converters (ADCs).

12. The method of claim 11, further comprising validating the analog signal to suppress dark counts.

13. The method of claim 11, wherein the SiPM device is one of a plurality of SiPM devices in an array, wherein each SiPM device in the array is readout by individual readout circuits.

14. The method of claim 11, wherein the analog signal comprises a timing signal and an energy signal, and wherein shaping the analog signal with the energy filter and the timing filter of the readout circuit comprises:

shaping the timing signal with the timing filter to make timing pulses from the front end buffer compatible with the timing channel; and shaping the energy signal with the energy filter to make energy pulses from the front end buffer compatible with the energy channel.

15. A time of flight (TOF) positron emission tomography (PET) system, comprising:

a detector ring including a plurality of detector blocks, each detector block in the plurality of detector blocks including an array of silicon photomultiplier (SiPM) devices, each SiPM device in the array coupled to one scintillation crystal of an array of scintillation crystals, wherein each crystal of the array of scintillation crystals is configured to emit Cherenkov light in response to interaction with a gamma ray; and readout electronics including a front-end readout circuit for each of SiPM devices in the array of SiPM devices, wherein the readout electronics are configured to read-out signals of detected Cherenkov light, wherein each front-end readout circuit comprises a timing pick-off circuit and one or more filters, wherein the timing pick-off circuit comprises a plurality of comparators configured to estimate rise time within 1-5 nanoseconds of a pulse, and wherein the readout electronics are configured to be triggered at a first level of $\frac{1}{3}$ single photoelectron (SPE) and validated at a second level of 1.5 SPE.

16. The TOF PET system of claim 15, wherein each of the array of scintillation crystals is a bismuth germanate oxide (BGO) scintillation crystal.

17. The TOF PET system of claim 15, wherein each front-end readout circuit further comprises a front-end buffer and an energy circuit.

* * * * *